Feb. 12, 1952   S. F. ESKEW   2,585,449
AUTOMOBILE TENT
Filed Oct. 31, 1950   2 SHEETS—SHEET 2
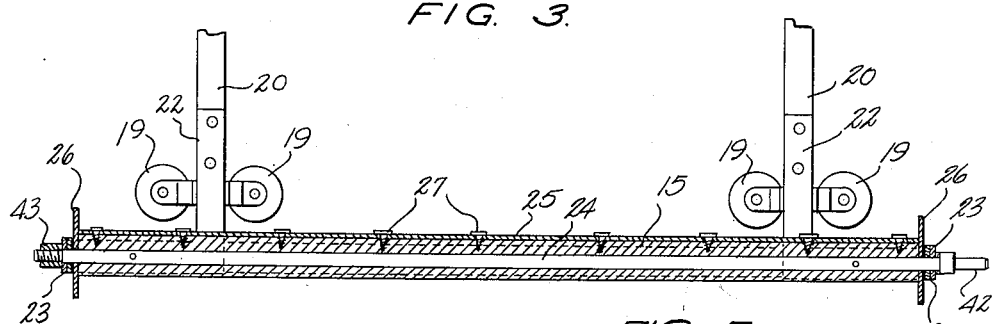
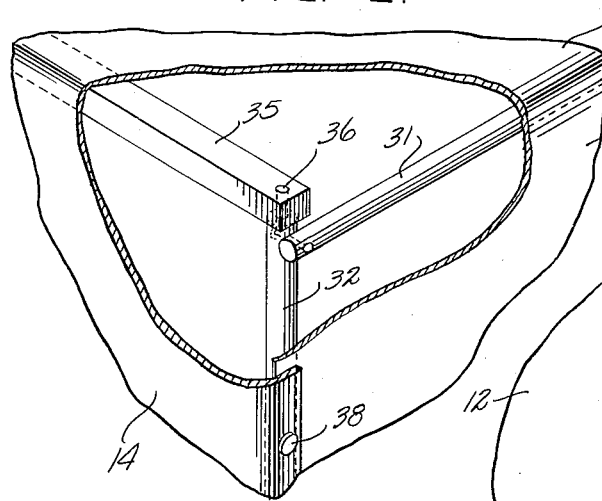
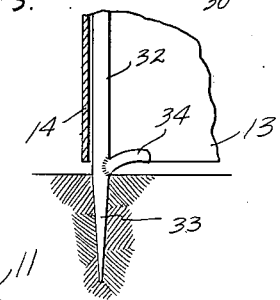
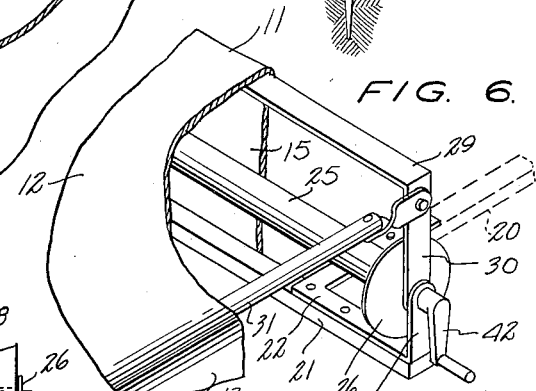
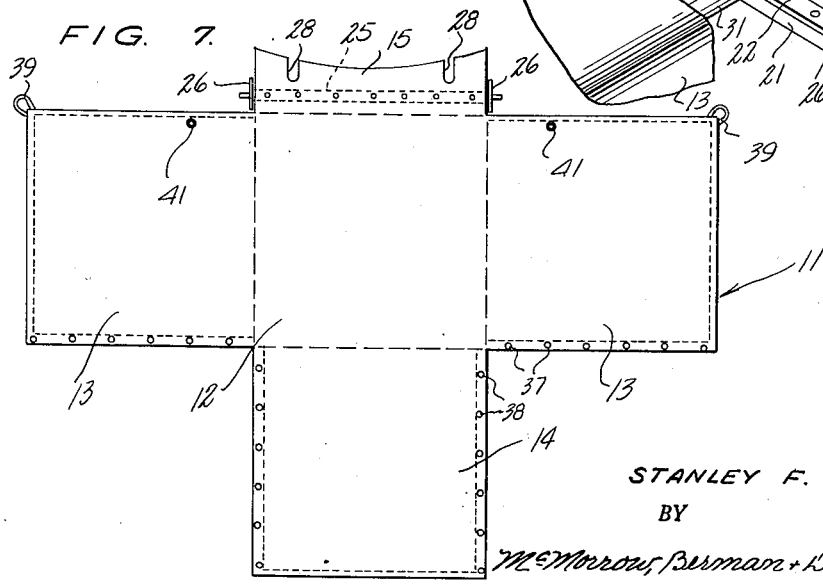
INVENTOR.
STANLEY F. ESKEW,
BY
McMorrow, Berman + Davidson
ATTORNEYS.

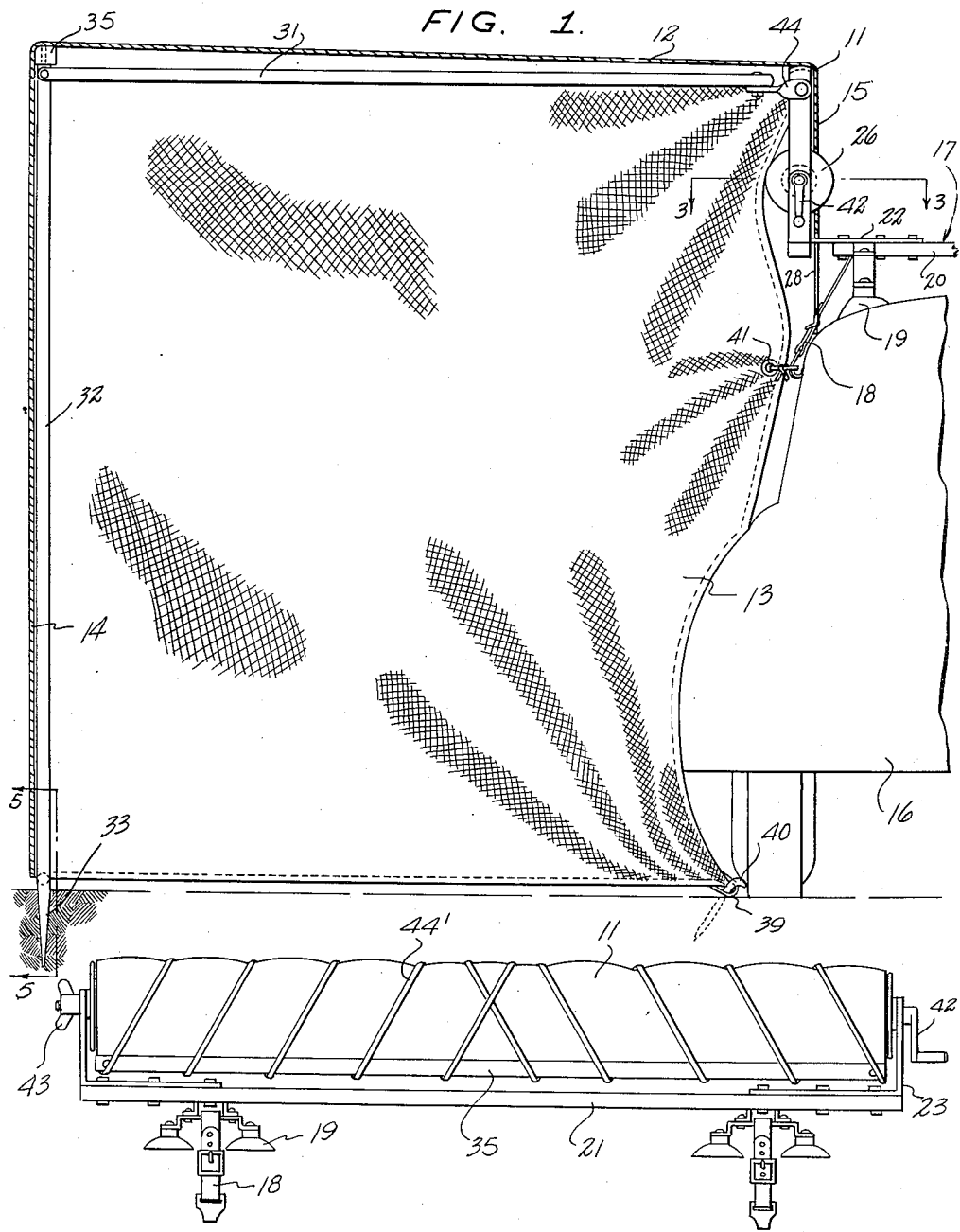

Patented Feb. 12, 1952

2,585,449

UNITED STATES PATENT OFFICE 2,585,449

AUTOMOBILE TENT

Stanley F. Eskew, Fayetteville, W. Va.

Application October 31, 1950, Serial No. 193,173

3 Claims. (Cl. 135—5)

This invention relates to tent structures, and more particularly to automobile tents.

A main object of the invention is to provide a novel and improved automobile tent which is simple in construction, which is easy to set up and to take down, and which may be mounted on the roof of an automobile and secured to the conventional luggage rack on the automobile roof.

A further object of the invention is to provide an improved automobile tent which involves only a few parts, which may be unfolded to operative position in a very short time, and with only a small amount of effort, which may be folded to a very compact condition when its use is not required, and which is very durable in construction.

Further objects and advantages of the invention will become apparent from the following description and claims, and from the accompanying drawings, wherein:

Figure 1 is an end elevational view of a portion of an automobile provided with an improved tent structure according to the present invention, the tent structure being shown set up at the side of the automobile;

Figure 2 is a side elevational view showing the tent body rolled up on its reel in an inoperative condition for transportation with the automobile;

Figure 3 is a cross-sectional, detail view taken on line 3—3 of Figure 1;

Figure 4 is an enlarged perspective view, partly broken away, of one of the top corners of the tent structure of Figure 1;

Figure 5 is an enlarged, cross-sectional, detail view taken on line 5—5 of Figure 1;

Figure 6 is an enlarged perspective, detail view of one of the top corners of the tent structure adjacent one end of the reel to which the tent body is secured in the tent structure of the present invention;

Figure 7 is a plan view of the tent body employed in the tent structure of Figures 1 to 6.

Referring to the drawings, 11 generally designates the tent body, said body comprising a roof portion 12 which is substantially square in shape, side flaps 13, 13, a rear end flap 14, and a relatively short front flap 15. Designated at 16 is a conventional passenger automobile, and designated at 17 is a conventional luggage rack mounted on the roof of the automobile and held thereon by the usual strap members 18 in cooperation with the suction cups 19. Designated at 20, 20 are transverse frame members forming part of the luggage rack 17. Designated at 21 is a longitudinal bar member secured to the transverse frame members 20, 20 by the respective L-shaped brackets 22, 22, as shown in Figures 3 and 6. At the ends of the bar member 21, the brackets 22 are formed with the upstanding lugs 23, and journaled in said lugs is the longitudinally extending shaft 24. Secured on the shaft 24 is the cylindrical reel 25 having the enlarged, circular end flanges 26, 26. As shown in Figures 3 and 7, the short front end flap 15 of the tent body 11 is secured to the reel 25 by suitable fasteners 27, the flap 15 being received between the circular end flanges 26, 26 of the reel in the manner shown in Figure 7. As further shown in Figure 7, the free outer margin of the flap 15 is arcuate in shape to conform with the curvature of the top of the automobile body and is formed with the respective notches 28, 28 adapted to receive the forwardly projecting portions of the bracket member 22, 22 when the flap 15 is in a depending condition.

Designated at 29 is a support or an elongated, U-shaped member which straddles the reel 25, the U-shaped member 29 having the end legs 30, 30 whose ends are rotatably connected to the shaft 24 and which are disposed between the respective circular flanges 26 and upstanding elements 23. As further shown in Figure 6, the U-shaped member 29 underlies the tent body 11 when said body is unreeled, and the member 29 may be employed to exert stretching force on said tent body when the member 29 is secured in an upstanding position, as shown in Figure 6.

Pivotally connected by twisted links 44 to the legs 30 of the member 29 adjacent the bight portion thereof are the respective longitudinally extending bar members 31, 31 which are adapted to serve as supports for the side marginal portions of the roof section 12 of the tent body. Pivotally connected to the ends of the members 31 are the respective additional bar members 32, 32, the free ends of the bar members 32 being pointed, as shown at 33, and being adapted to be embedded in the ground to secure the members 32 in vertical positions, as shown in Figure 1. The bar members 32 are provided adjacent their pointed ends 33 with the laterally projecting arms 34 on which downward force may be applied to cause the point portions 33 to penetrate into the ground when setting up the tent. Designated at 35 is a transverse corner bar having apertured ends engageable over axially projecting pin elements 36 secured on the hinged ends of the bar member 32, as shown in Figure 4, the transverse bar member 35 being adapted to underlie the tent body to support the rear transverse margin of the roof section 12 thereof. As shown in Figure 7, the margins of the flaps 13 and 14 are provided with the mating snap fastener elements 37 and 38, whereby the rear marginal edges of the flap members 13 may be secured to the side edges of the flap member 14 in the manner shown in Figure 4, to define the tent enclosure. The forward outer corners of the flap members 13, 13 are provided with the loops 39 which may be engaged by stakes 40 in the manner shown in Figure 1, to anchor the forward corners of the flaps 13 to the ground. The forward margins of the flaps 13 are also provided with grommets 41 which may be tied to the hooked ends of the straps 18, as shown in Figure 1.

One end of the shaft 24 is provided with the hand crank 42, and the other end of said shaft has a nut 43 threaded thereon which may be tightened to lock the shaft 24 against rotation relative to the upstanding members 23, 23, as well as to lock the leg portions 30 of the U-shaped member 29 in either an upstanding position, as shown in Figure 6, or in a lowered position.

When the tent is not in use, the flaps 13, 13 are folded over onto the roof section 12 of the tent body, and the tent body is rolled up on the reel 25, the removable transverse bar 35 being tied to the rolled-up tent body by the use of suitable ropes or cables 44', as shown in Figure 2. The U-shaped member 29 is swung forwardly over the bracket member 22 and the side bars 31 and 32 are folded up and are laid over the luggage rack 17. To set up the tent, it is merely necessary to swing the bars 31 and 32 outwardly to the positions shown in Figure 1, rotating the U-shaped member 29 upwardly and locking said member in the upstanding position thereof shown in Figures 1 and 6, by means of the wing nut 43. The pointed ends 33 of the bar members 32 are embedded in the ground and the transverse supporting bar 35 is engaged on the pin 36 at the ends of the bar members 32. The tent body is then wound from the reel 25 and engaged over the framework defined by the members 29, 31, 32 and 35, the wing nut 43 preferably being loosened until the tent body has been secured to said framework. After the tent body has been spread over the framework, the snap fasteners 37 and 38 are interengaged and the forward edges of the flaps 13, 13 are anchored by means of the stakes 40 and by securement of the grommets 41 to the hooked ends of the strap members 18. After all portions of the tent body have been secured, the U-shaped member 29 may be elevated to provide the final stretching action on the tent body and may be locked in elevated position by tightening the wing nut 43.

When the tent body is rolled up in the manner shown in Figure 2, the reel and parts adjacent thereto are securely locked by the wing nut 43. The frame bars, as above described, overlie and rest on the carrier rack on the roof of the automobile and may be secured thereto by any suitable means. The tent structure is, therefore, readily disposed on the roof of the automobile ready for use as an emergency over-night tent, for dressing rooms at beaches and resorts, for sunshade beside the car, or for other desired uses.

While a specific embodiment of an improved automobile tent has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In combination, a longitudinal carrier rack adapted to be mounted on the roof of an automobile, a longitudinal reel rotatably mounted on one side marginal portion of said rack, a body of flexible material secured to said reel and adapted to be rolled up thereon, a support adjacent said reel and pivoted to said rack for rotation around the same axis of said reel, a foldable frame pivotally connected to said support, said frame being at times foldable onto said rack and being at other times unfoldable to define an upstanding framework adjacent the side of the automobile carrying the reel, and means arranged for securing said body of flexible material over said framework to define a tent enclosure.

2. In combination, a longitudinal carrier rack adapted to be mounted on the roof of an automobile, a longitudinal reel rotatably mounted on one side marginal portion of said rack, a body of flexible material secured to said reel and adapted to be rolled up thereon, an elongated U-shaped member, the ends of the arms of said U-shaped member being pivoted to said rack for rotation around the same axis as said reel and said member straddling the reel, a foldable frame pivotally connected to the arms of said U-shaped member, said frame being at times foldable onto said rack and being at other times unfoldable to define an upstanding framework adjacent the side of the automobile carrying the reel, and means arranged for securing said body of flexible material over said framework to define a tent enclosure.

3. In combination, a longitudinal carrier rack adapted to be mounted on the roof of an automobile, a shaft journaled to one side marginal portion of said rack, a reel secured on said shaft, a body of flexible material secured to said reel and being adapted to be rolled up thereon, an elongated U-shaped member pivoted to said shaft in endwise straddling relation to said reel, a foldable frame pivotally connected to the legs of said U-shaped member and being arranged to be at times folded onto said rack and at other times unfolded to to define a tent framework adjacent the side of the automobile carrying said shaft, said body of flexible material being shaped to fit over the unfolded framework and the U-shaped member to define a tent enclosure, means for securing said body to the unfolded framework, and means on one end of said shaft and movable into and out of engagement with the adjacent leg of U-shaped member for locking said U-shaped member in an upstanding position relative to said shaft, whereby the bight portion of the U-shaped member exerts stretching action on the body of flexible material.

STANLEY F. ESKEW.

REFERENCES CITED

The following references are of record in the file of this patent:

UNITED STATES PATENTS

| Number | Name | Date |
| --- | --- | --- |
| 2,107,608 | Hewlett | Feb. 8, 1938 |